United States Patent [19]
Bohannon et al.

[11] Patent Number: 5,623,670
[45] Date of Patent: Apr. 22, 1997

[54] METHOD AND APPARATUS FOR CRASH SAFE ENFORCEMENT OF MUTUALLY EXCLUSIVE ACCESS TO SHARED RESOURCES IN A MULTITASKING COMPUTER SYSTEM

[75] Inventors: Philip L. Bohannon, Maple Shade; Jacques Gava, Plainfield; Daniel F. Lieuwen; Sundararajarao Sudarshan, both of New Providence, all of N.J.

[73] Assignee: Lucent Technologies Inc., Murray Hill, N.J.

[21] Appl. No.: 390,179

[22] Filed: Feb. 17, 1995

[51] Int. Cl.$^6$ ........................................ G06F 13/14
[52] U.S. Cl. ............................... 395/726; 395/474
[58] Field of Search .................... 395/726, 474, 395/481, 475, 181

[56] References Cited

U.S. PATENT DOCUMENTS

| | | | |
|---|---|---|---|
| 4,318,182 | 3/1982 | Bachman et al. | 395/726 |
| 4,591,976 | 5/1986 | Webber et al. | 395/650 |
| 4,594,657 | 6/1986 | Byrons | 395/729 |
| 4,718,002 | 1/1988 | Carr | 395/481 |
| 4,819,154 | 4/1989 | Stiffler et al. | 395/489 |
| 4,965,718 | 10/1990 | George et al. | 395/478 |
| 5,161,227 | 11/1992 | Dias et al. | 395/726 |
| 5,206,952 | 4/1993 | Sundet et al. | 395/726 |
| 5,261,106 | 11/1993 | Lentz et al. | 395/726 |
| 5,339,443 | 8/1994 | Lockwood | 395/732 |
| 5,361,347 | 11/1994 | Colider et al. | 395/575 |
| 5,394,551 | 2/1995 | Holt et al. | 395/726 |
| 5,428,783 | 6/1995 | Lake | 395/650 |
| 5,432,929 | 7/1995 | Escola et al. | 395/600 |
| 5,440,746 | 8/1995 | Lentz | 395/726 |
| 5,440,752 | 8/1995 | Lentz et al. | 395/481 |
| 5,522,029 | 5/1996 | Hatfield | 395/181 |

OTHER PUBLICATIONS

Anderson, T.E., "The Performance of Spin Lock Alternatives for Shared–memory Multiprocessors," IEEE Transactions on Parallel and Distributed Systems, vol. 1, No. 1, Jan. 1990, pp. 6–16.

Bershad, B.N., et al., "Fast Mutual Exclusion for Uniprocessors," ASPLOS V–10/92/MA,USA, pp. 223–233.

Craig, T.S., "Building FIFO and Priority–Queuing Spin Locks from Atomic Swap," Technical Report 93–02–02, Feb. 1, 1993, pp. 1–29.

Eisenberg, M.A., and McGuire, M.R., "Further Comments on Dijkstra's Concurrent Programming Control Problem," Communications of the ACM, vol. 15, No. 11, Nov. 1972, p. 999.

Gotemukkala, V., and Lehman, T.J., "Locking and Latching in a Memory–Resident Database System," Proc. of the 18th VLDB Conf., Vancouver, British Columbia, Canada, 1992, pp. 533–544.

Graunke, G., and Thakkar, S., "Synchronization Algorithms for Shared–Memory Multiprocessors," Computer, Jun. 1990, pp. 60–68.

Jagadish, H.V., et al., "Dali: A High Performance Main Memory Storage Manager," Proc. of the 20th VLDB Conf., Santiago, Chile, 1994.

Khanna, S., et al., "Realtime Scheduling SunOS 5.0," In Winter Usenix Conference 1992, 1992.

(List continued on next page.)

Primary Examiner—Ayaz R. Sheikh

[57] ABSTRACT

A fast crash safe method and apparatus for enforcing mutually exclusive access to shared resources in a computer system through the use of semaphores. The acquisition and release of the semaphores is implemented at the user process level. An overestimate and underestimate of semaphore ownership are maintained in memory by library provided semaphore acquisition and release code. A cleanup routine reconciles the overestimate and underestimate to determine the ownership status of the semaphores.

25 Claims, 11 Drawing Sheets

OTHER PUBLICATIONS

Mellor-Crummey, J.M., and Scott, M.L., "Algorithms for Scalable Synchronization on Shared-Memory Multiprocessors," ACM Transactions on Computer Systems, vol. 9, No. 1, Feb. 1991, pp. 21–47.

Silberschatz, A., and Galvin, P., *Operating System Concepts*, Ch. 6, Addison–Wesley, 4 edition, 1993, pp. 170–181.

Sindhu, P.S., and Frailong, J–M., "Formal Specification of Memory Models," Technical Report CSL–91–11 [P91–00112], Xerox Corporation, Dec. 1991.

Sullivan, M., and Stonebraker, M., "Using Write Protected Data Structures to Improve Software Fault Tolerance in Highly Available Database Management Systems," Proc. of the 17th International Conf. on Very Data Bases, Barcelona, Sep. 1991, pp. 171–180.

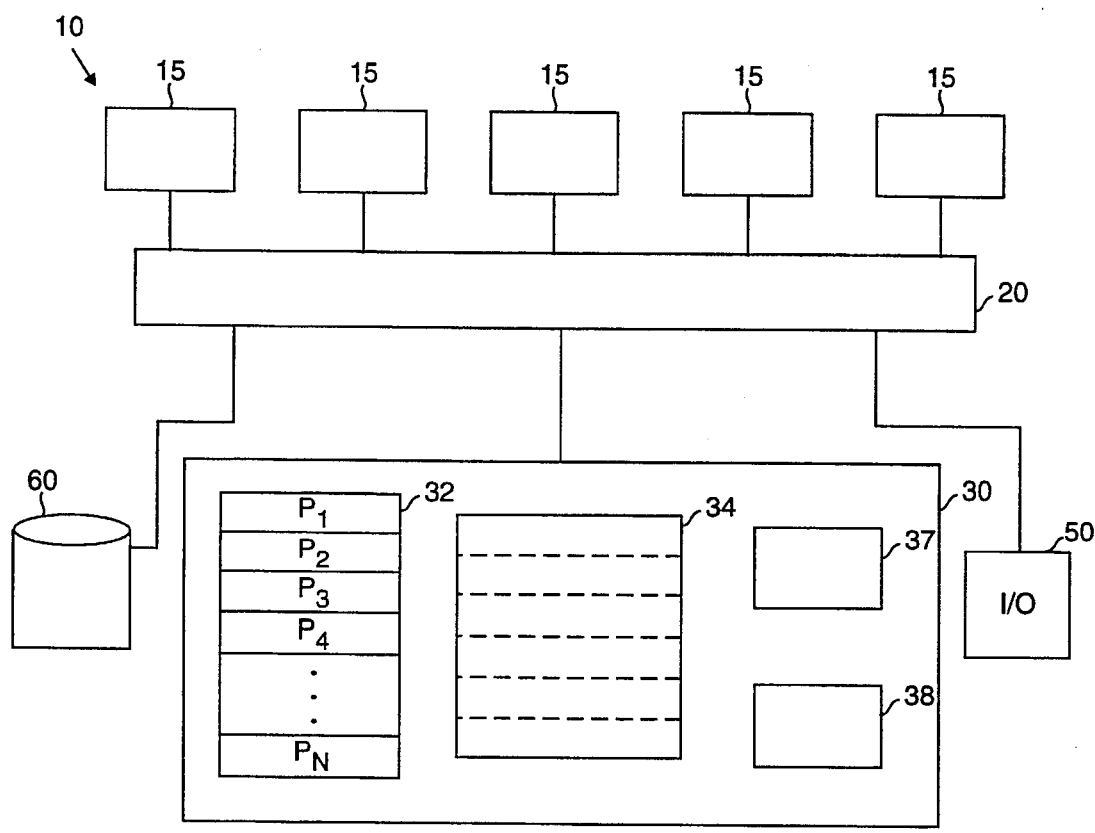
FIG. 1
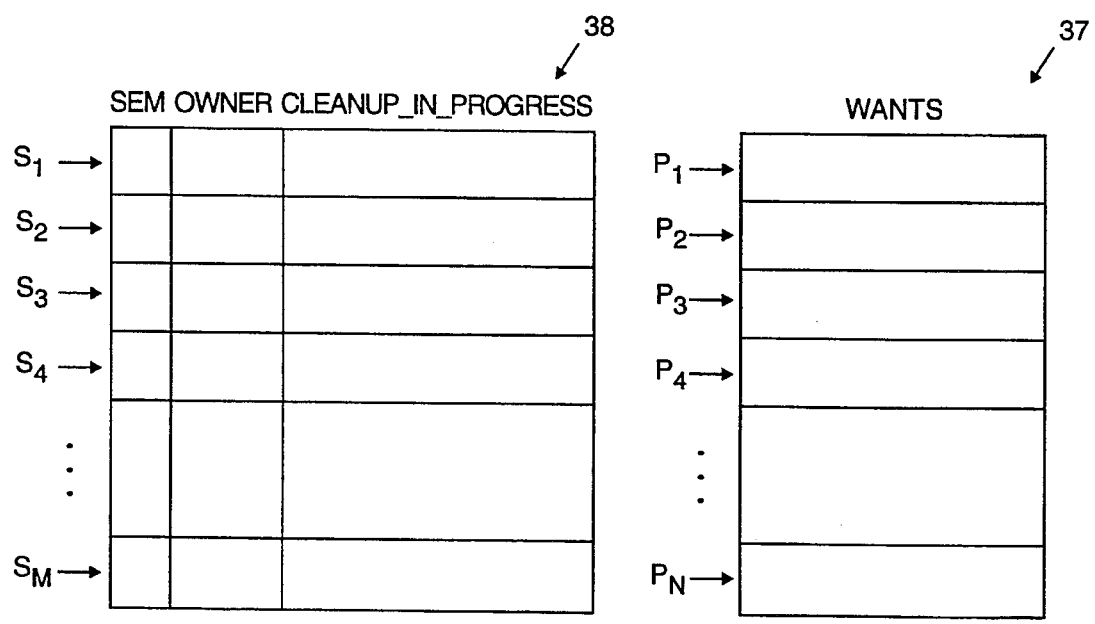
FIG. 2  FIG. 3

METHOD AND APPARATUS FOR CRASH SAFE ENFORCEMENT OF MUTUALLY EXCLUSIVE ACCESS TO SHARED RESOURCES IN A MULTITASKING COMPUTER SYSTEM

FIELD OF THE INVENTION

This invention relates broadly to enforcing mutually exclusive access to shared resources in a multitasking computer system. In particular, this invention relates to the use of crash safe semaphores to enforce mutually exclusive access to shared resources.

BACKGROUND OF THE INVENTION

In multiprocessor computer systems, multiple processes execute concurrently on the multiple processors. These processes often share resources, such as storage devices, input/output devices and memory. When two or more processes need to operate on the same data in memory, or on the same device, it becomes necessary to provide a mechanism to enforce mutually exclusive access to the resources. Such a mechanism is also required in a single processor system which supports pre-emptive multitasking of processes. In other words, a mechanism is required to allow only one process to have access to a resource at any one time.

A semaphore is a synchronization mechanism which mediates access to shared resources. When a process has acquired a semaphore, it is not possible for any other process to acquire the semaphore until the first process has released the semaphore. Thus, semaphores are used to guarantee mutual exclusion of shared resources.

In a system where multiple processes operate on shared data and acquire semaphores, it is possible for a process to acquire a semaphore and then fail (typically due to a software bug in the process that causes the operating system to terminate the process). Unless corrective action is taken, the semaphore will not be released since the process is no longer alive to release it. This can severely affect the functioning of other processes that want to access the shared resource. Until the semaphore is recovered, other processes will be excluded from acquiring the semaphore and accessing the resource.

In order to perform recovery actions on a semaphore which is held by a failed process and release it, a system can either (a) determine which process failed while holding the semaphore and perform recovery actions on a process level, or (b) perform recovery actions on a system level by terminating all processes that could have acquired the semaphore and reinitializing the entire system, including the semaphores. System level recovery could severely affect availability of a system, and is not desirable in many contexts. In a system in which the multiple processes are tightly coupled, i.e. all processes are working on a common task, the problem of not being able to determine whether a crashed process held a semaphore is not a significant problem. If a process crashes, the entire computation must be restarted anyway, and recovering all the resources and resetting the semaphores does not add significant cost to reinitializing the system. However, the indeterminate aspect of semaphore ownership becomes a problem in a system in Which many of the processes are unrelated. In such a system, if one process crashes, it is desirable to allow the other processes to continue running uninterrupted. It is therefore desirable to be able to detect which process failed while holding a semaphore and perform a process level recovery.

Detecting which process failed while holding a semaphore is straightforward if system semaphores are used. System semaphores are semaphores which are implemented within the operating system kernel. However, semaphores provided by typical operating systems are very slow. Semaphores implemented at the user level (also known as spin-locking semaphores) are widely used because of their speed, and are important in time critical applications. However, with such semaphores, it is possible for process failure at critical points in the semaphore acquisition code to leave the system in a state where it is not clear which process holds a semaphore, making it impossible to perform recovery actions on a per process basis.

The present invention provides for semaphores implemented at the user level while allowing the system to determine when a failed process holds a semaphore regardless of when the process may have failed. Thus, the invention allows fault-tolerant systems to be built using a natural and high-performance architecture for sharing resources using fast user level semaphores for synchronization.

SUMMARY OF THE INVENTION

This invention provides a fast crash safe semaphore mechanism to enforce mutually exclusive access to shared resources in a multiprocessor computer system. These semaphores are implemented at a user level by providing common library code used by all processes which controls the acquisition and release of the semaphores.

The library provided semaphore acquisition and release code registers information about semaphore ownership in shared memory. Two approximations of semaphore ownership are maintained. One is an underestimate of which process has the semaphore, and the other is an overestimate of which process has the semaphore. The underestimate is registered after a process acquires a semaphore and deregistered before the process releases the semaphore. The overestimate is registered before a process acquires a semaphore and deregistered after the process releases the semaphore. If a process crashes in certain critical parts of the semaphore acquisition or release code, the underestimate and overestimate for the semaphore will not match.

To handle the case where the underestimates and overestimates do not match, a cleanup process looks at the information maintained by the system for all other processes registered with the system in order to obtain extra information about which process may have a given semaphore. The cleanup process may be called when the status of a recently killed process with respect to a semaphore is unclear, or when a semaphore has been unavailable for a long time. Using the underestimate and overestimate of semaphore ownership, the cleanup process will determine the status of the semaphore. If a process crashed before releasing the semaphore, the cleanup process will reset the semaphore and will recover the protected resource.

If we make the assumption that all processes make progress while executing the library provided semaphore acquisition and release code, then the cleanup routine will determine the status of the semaphore within a finite period of time. However, if this assumption is not true, then an abort timer is introduced into the system. If a process does not make reasonable progress, then it may be terminated so that the cleanup routine may determine the status of the semaphore in a finite period of time.

When the cleanup routine is initiated, a barricade is raised which prevents processes which have not already initiated an attempt to acquire the semaphore from doing so. This allows the cleanup routine to determine the status of the semaphore without having to deal with the possibility of a continuous stream of processes requesting the semaphore during the cleanup process.

The advantages of the present invention will be apparent to those of ordinary skill in the art by reference to the following detailed description and the accompanying drawings.

BRIEF DESCRIPTION OF THE DRAWINGS

FIG. 1 is a block diagram of a shared memory multiprocessor computer system.

FIG. 2 shows the structure of the semaphore structure suitable for storing semaphore records.

FIG. 3 shows the structure of the semaphore access structure suitable for storing semaphore access records.

DETAILED DESCRIPTION

Figure 4A:
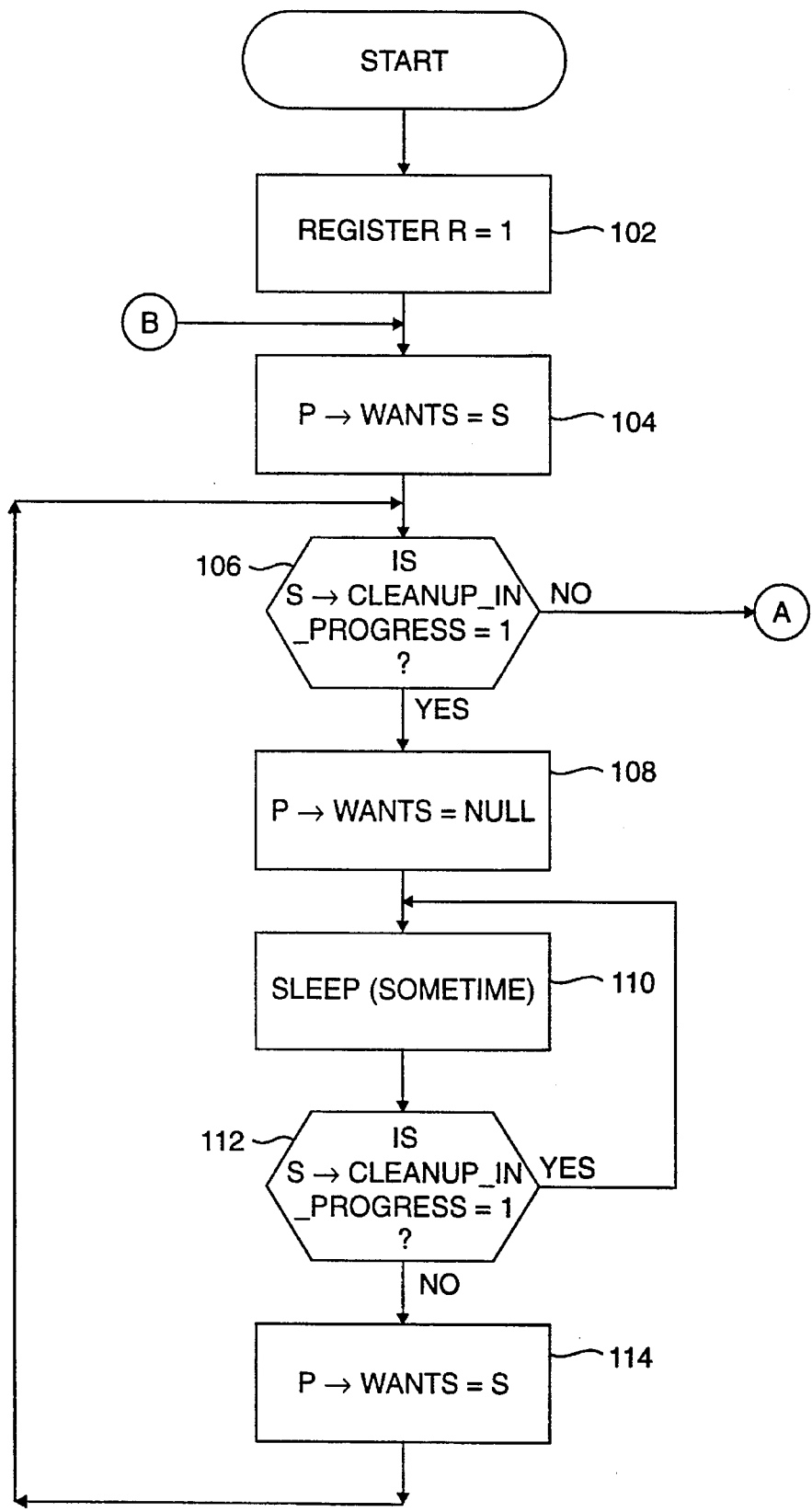
FIGS. 4A–4B show a flow diagram of the steps of the GetSem routine for acquiring a semaphore.

A shared memory multiprocessor computer system 10 is shown in FIG. 1. A plurality of processing units 15 are connected to a communication bus 20. In addition, the communication bus 20 is connected to a memory unit 30. Thus, the memory unit 30 is accessible by each of the processing units 15. Also connected to the communication bus 20 may be other system resources such as a common storage device 60, and an input/output device 50. During operation of the computer system 10, each of the processes $P_1$–$P_N$ will be assigned to one of the processing units 15 for execution. The computer program code for these processes is stored in storage area 32 within the memory 30. The memory 30 may also contain a storage area 34 which contains the data on which the various processes will operate. The storage area 34 may be logically subdivided into separate storage areas for the storage of data structures, as represented by the dotted lines in storage area 34.

During execution of the processes $P_1$–$P_N$ on processing units 15, it may be desirable to enforce mutually exclusive access to the various system resources, such as the data structures in storage area 34, storage device 60 and input/output device 50. These resources, on which mutually exclusive access is enforced, will be referred to as protected resources. Thus, only one process can have access to a protected resource at a given time. If, in the course of acquiring, using or releasing a protected resource, a process crashes, it is desirable to be able to continue executing the other system processes without the need to reinitialize the entire system 10. The present invention provides such a mechanism which does not require implementation within the operating system kernel.

Two data structures are stored in the memory 30 in order to implement the crash safe semaphore mechanism of the present invention. The first is a semaphore access structure 37, and the second is a semaphore structure 38. FIG. 2 shows a logical illustration of the semaphore structure 38 in the memory 30. The semaphore structure 38 is stored in a region of the memory 30 accessible by each of the processes $P_1$–$P_N$. Each record in this data structure 38 is referred to as a semaphore, and is made up of three variables: sem, owner, and cleanup_in_progress. There is one semaphore associated with each protected resource. Thus, in this discussion, we assume there are M resources to be protected and M semaphore records in the semaphore structure 38. We use the following notation in referring to the variables in the semaphore structure 38. If referring to a semaphore S, then the sem variable for semaphore S is represented by S→sem; the owner variable for semaphore S is represented by S→owner; and the cleanup_in_progress variable for semaphore S is represented by S→cleanup_in_progress.

The variable sem is the test-and-set semaphore variable. A value of 1 in the S→sem variable indicates that the semaphore S is held by a process and the protected resource is unavailable. A value of 0 in the S→sem variable indicates that the semaphore S is not held by a process and the protected resource is available. The variable owner will contain an identification of the process which is registered as the owner of the semaphore. As will be discussed in further detail below, this owner variable will be used to provide the safe underestimate of semaphore ownership. The variable cleanup_in_progress may only be written by the Cleanup-Semaphore routine and is used as a barricade. The Cleanup-Semaphore routine and the use of a barricade will be described in further detail below. Semaphore records may be allocated and deallocated like any other object in a manner which is well known in the art. Each semaphore record is initialized by a single process prior to other processes attempting to acquire the semaphore record.

FIG. 3 shows a logical illustration of the semaphore access structure 37 in the memory 30. Each record in the semaphore access structure 37 is made up of one variable: wants. There is one record in the semaphore access structure 37 for each process. Preferably, each record in the semaphore access structure 37 is accessible by a Cleanup-Daemon, discussed below, and the associated process. In this discussion there are N processes $P_1$–$P_N$ and N records in the semaphore access structure 37. We use the following notation in referring to the wants variable in the semaphore access structure 37. If referring to a process P, then the wants variable for process P is represented by P→wants. As will be discussed in further detail below, the wants variable contains an indication of the semaphore which a process desires to acquire. It is set by a process prior to trying to acquire the semaphore. It is the complement to the owner variable in the semaphore structure 38, and it provides the safe overestimate of semaphore ownership.

Figure 5:
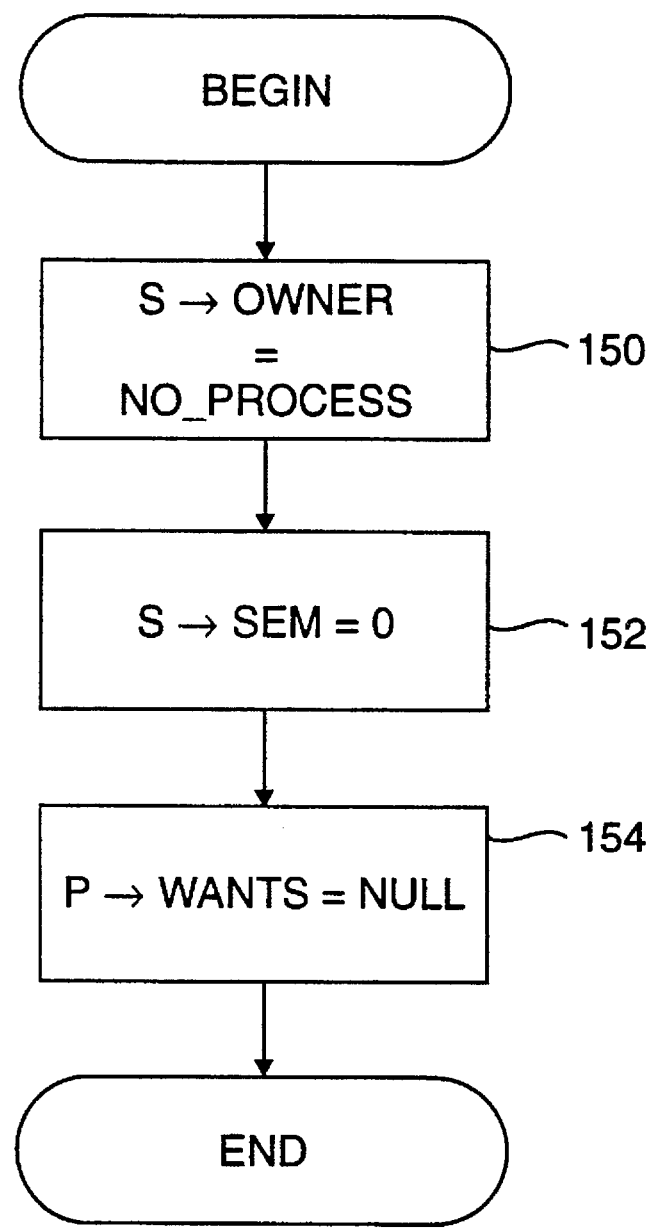
FIG. 5 shows a flow diagram of the steps of the ReleaseSem routine for releasing a semaphore.

Semaphore access records are allocated in shared memory for each new process. Such allocation of records is well known to those skilled in the art. The semaphore access record for a process is deallocated when the process terminates normally or when it crashes. When a process P terminates normally, the exit routine will determine if any semaphores are held, and if so, the ReleaseSem routine, discussed below in conjunction with FIG. 5, will be executed to release the held semaphores. Thus, P→wants will contain a null value because the ReleaseSem routine will set P→wants=null upon successful completion of the routine. After a process terminates normally, its semaphore access record is deallocated for use by some other future process. Such deallocation of records is also well known to those skilled in the art. When a process terminates abnormally, i.e. crashes, the Cleanup-Daemon routine will eventually reinitialize the P→wants variable to null and deallocate the record. This function of the Cleanup-Daemon routine will be discussed in further detail below in conjunction with FIG. 6.

During execution of the processes $P_1$–$P_N$ on the processing units 15, a process may require mutually exclusive access to a protected resource. In order to gain such access, the process must acquire the protected resource's semaphore. When the process is finished with the resource, it must release the semaphore so that other processes may gain access to the resource. The acquisition and release of semaphores is carried out by the common library routines GetSem and ReleaseSem respectively. All processes preferably call these library provided routines for semaphore handling. Using one set of common library code provides for consistent access to semaphore data structures by the processes. Although the GetSem and ReleaseSem routines are common to all processes, this technique is not the same as implementing semaphores through the operating system kernel, i.e. system semaphores. The semaphores described herein are implemented at the user process level (for speed).

Figure 4B:
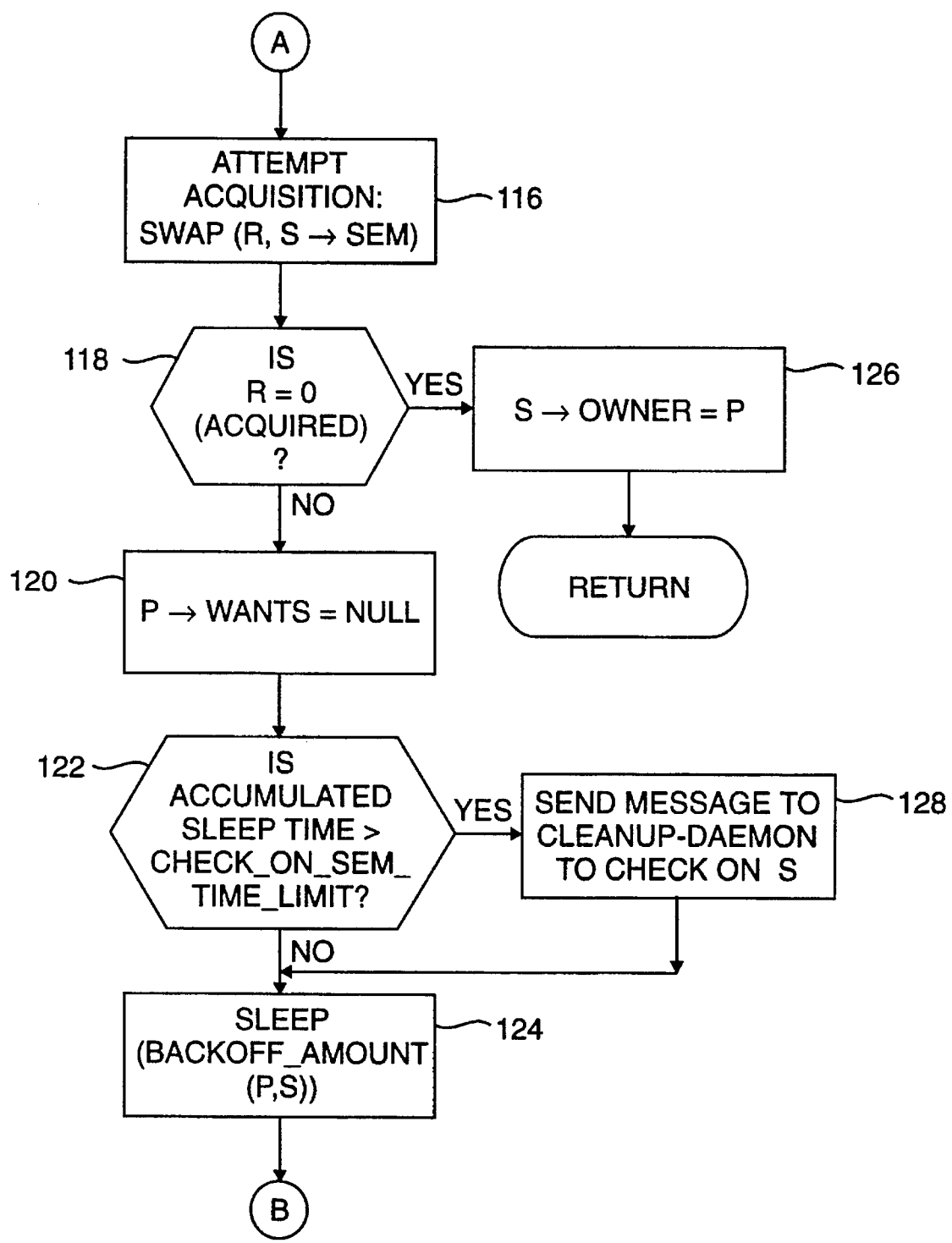

The steps of the GetSem routine are described in conjunction with FIGS. 4A and 4B. As discussed above, each of the processes $P_1$–$P_N$ executes on one of the processing units 15. When a process wants access to a protected resource, it calls the GetSem routine in order to acquire the protected resource's semaphore. When a process calls the GetSem routine, it provides that routine with its process identification P and the semaphore S it wants to acquire. In step 102, a register R is set to the value 1. In step 104, P→wants is set to the requested semaphore S. Thus, the wants variable is set to indicate the semaphore S which the process P wants to acquire before actually making an attempt to acquire it. Thus, this is the safe overestimate of semaphore ownership used by the Cleanup-Semaphore routine, which will be described in detail below. In step 106, the GetSem routine checks to see if S→cleanup_in_progress=1. This cleanup_in_progress variable is the barricade used by the Cleanup-Semaphore routine and will be discussed in further detail below.

If S→cleanup_in_progress=1 it means that the Cleanup-Semaphore routine is currently cleaning up the desired semaphore S. In this situation, processes are blocked from attempting to acquire access to the semaphore S. Thus, if the Cleanup-Semaphore routine is in progress, then P→wants is set to null in step 108, and the process calls a sleep routine and indicates the amount of time to sleep in step 110. When a process executes a sleep command, it is indicating to the processing unit 15 on which it is executing that the process may be swapped out of execution and another process waiting to execute may be started.

Since each processing unit 15 may have multiple processes assigned to it, it is possible that one of the other processes assigned to the processing unit 15 has possession of the semaphore S and will only release it if it is able to continue its execution. The execution of a sleep command by the process waiting for a semaphore also reduces bus traffic by preventing continuous requests for the semaphore. After sleeping, the barricade is checked again in step 112. If S→cleanup_in_progress is still 1, then the process continues to sleep until the barricade is down (S→cleanup_in_progress=0). When the barricade is down, P→wants is set to S in step 114, again indicating that process P wants semaphore S. Control is passed back to step 106 where the barricade is checked again, to determine if the Cleanup-Semaphore routine was initiated in the interim between steps 112 and 106. If the barricade was raised again, then steps 106 through 114 are repeated. Thus, the GetSem routine will loop through steps 106 through 114 until the Cleanup-Semaphore routine is no longer in effect for the desired semaphore S.

When the cleanup barricade is down, the GetSem routine will attempt to acquire semaphore S. In step 116 (FIG. 4B), the routine swaps register R with S→sem. This swap instruction is an "atomic" instruction in that the hardware of the processor ensures that no other processing can interfere with the operation of the instruction. Although we use the swap instruction in this description, one skilled in the art would readily recognize that other atomic operations, such as test-and-set, could be used equivalently. Register R was set to 1 in step 102. There are two possible results of step 116. If the semaphore was available (S→sem=0), then after step 116 register R will contain 0 and S→sem will contain 1. In such a case, the process P has acquired the semaphore. If the semaphore was not available (S→sem=1), then after step 116 register R will contain 1 and S→sem will contain 1. In such a case, process P has not acquired the semaphore. Thus, the value in register R after step 116 indicates whether process P has acquired the semaphore. If R contains a 0, then process P has acquired the semaphore. If R contains a 1, then process P has not acquired the semaphore. This condition is checked in step 118.

Thus, if it is determined during step 118 that R=0, the process has acquired the semaphore and then S→owner is set to P during step 126 in order to register process P as the current owner of semaphore S. Thus, S→owner represents the safe underestimate of ownership of semaphore S in that it is only set to the process identification immediately after the process acquires the semaphore. After registering ownership, the GetSem routine ends.

If, however, R=0 is determined to be false in step 118 (the process has not acquired the semaphore), then P→wants is set to null in step 120. The process will then sleep for an amount of time determined by the function Backoff_Amount. Backoff_Amount is a function which determines the amount of time for a process to sleep. The function is provided with the process identification P and the semaphore S, and will determine how much time a process will sleep based upon how many times the process has unsuccessfully tried to obtain the semaphore. Backoff_Amount may employ exponential backoff, such that the amount of time a process will sleep is increased exponentially each successive time the process is unsuccessful in acquiring the semaphore. This Backoff_Amount function can be readily implemented by one skilled in the art, and the details of such a function will not be described further herein.

In step 122, the accumulated sleep time is checked against the constant Check_On_Sem_Time_Limit. This Check_On_Sem_Time_Limit constant represents the amount of accumulated sleep time at which point it is suspected that the semaphore the process is trying to acquire is held by a dead (i.e. crashed) process. Thus, if the accumulated sleep time is greater than Check_On_Sem_Time_Limit, then a message is sent to the Cleanup-Semaphore routine in step 128 to request that the Cleanup-Semaphore routine check on the semaphore S. If the accumulated sleep time is not greater than Check_On_Sem_Time_Limit, then in step 124 the process will sleep for the determined amount of time, and control will pass to step 104 (FIG. 4A).

Under normal operating conditions, after a process acquires a semaphore, it will use the resource associated with the semaphore and it will release the semaphore when it is finished with the resource. Semaphore release is handled by the ReleaseSem routine. The releasing processor will call the ReleaseSem routine and provide it with its processor identification P and an identification of the semaphore S it is releasing. The functioning of the ReleaseSem routine is described in conjunction with FIG. 5. In step 150, S→owner is set to No_Process. As discussed above, the S→owner variable is the safe underestimate of semaphore ownership, and is therefore set to No_Process before the semaphore is actually released. In step 152, the semaphore is released by setting S→sem=0. In step 154, P→wants is set to null. Since P→wants is the safe overestimate of semaphore ownership, it is not set to null until after the semaphore is actually released.

If the above GetSem and ReleaseSem routines are used for the acquisition and release of semaphores, the system will be able to recover from indeterminate situations in which a semaphore may have been lost (i.e. held by a dead or non-progressing process). Such recovery is possible because of the use of the underestimate and overestimate of semaphore ownership. The process of cleaning up a semaphore will be discussed below. In order to avoid any problems with multiple or concurrent cleanup processes, a single process is used to call the Cleanup-Semaphore routine. This calling process is called the Cleanup-Daemon. The Cleanup-Daemon is initiated when the system 10 is initialized and it executes on one of the processing units 15 at a sufficient priority to ensure a prompt response to failed processes. As will be discussed below, there are two situations for which the Cleanup-Daemon routine will call the Cleanup-Semaphore routine.

Figure 6:
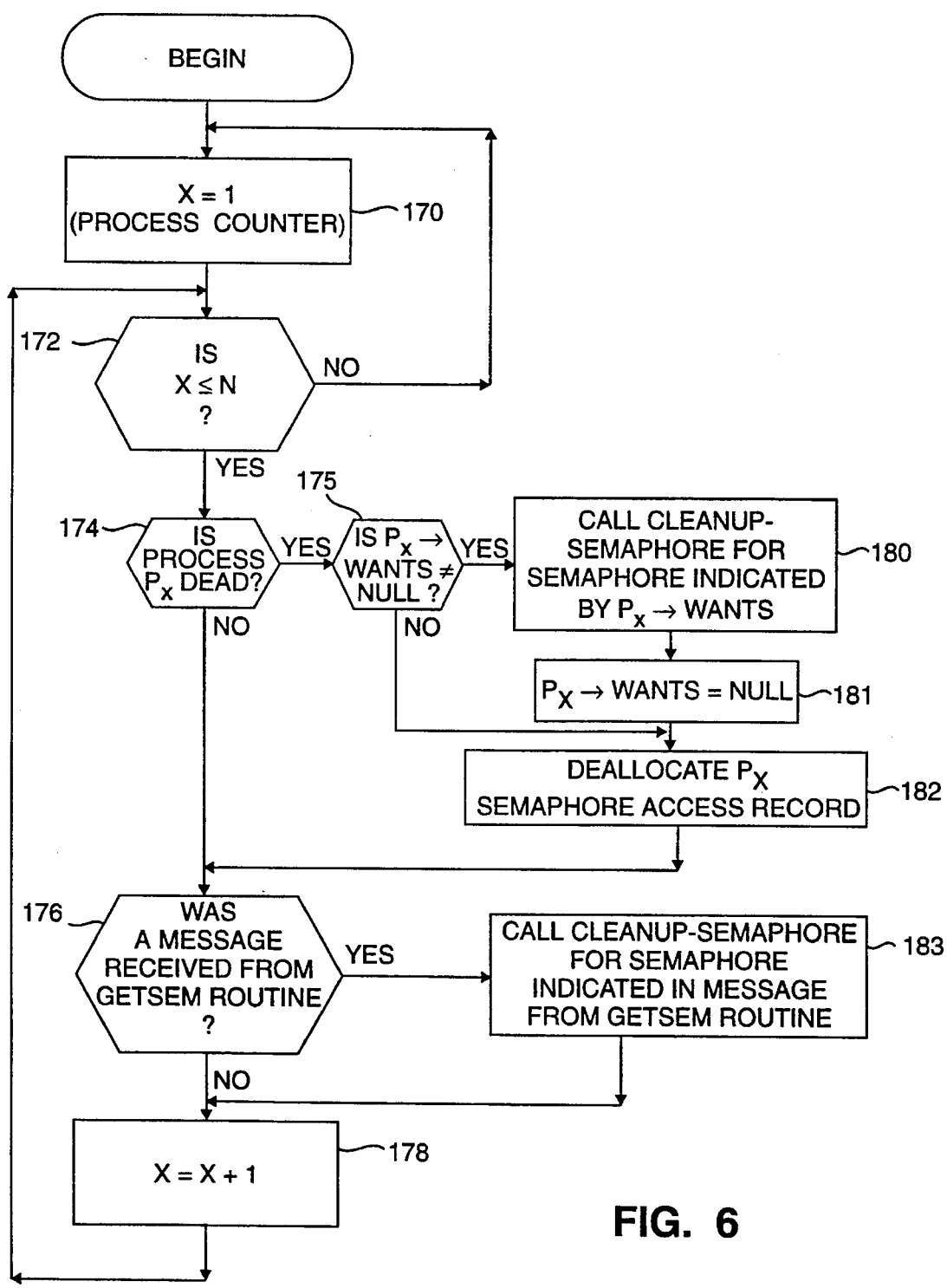
FIG. 6 shows a flow diagram of the steps of the Cleanup-Daemon for determining when a semaphore needs to be cleaned up.

The Cleanup-Daemon routine will be described in conjunction with FIG. 6. In step 170, a process counter variable, X, is initialized to 1. In step 172, X is compared to the number of processes N in the system 10. If X<=N, then in step 174 it is determined whether process $P_x$ is dead. If it is, then in step 175 it is determined if $P_x$→wants is not Null. If the test of step 175 is true, then process $P_x$ died after entering the GetSem routine but without fully executing the ReleaseSem routine and possibly still holds the semaphore S contained in $P_x$→wants. Thus, if the test in step 175 is true, then the Cleanup-Semaphore routine is called to cleanup the semaphore S indicated in $P_x$→wants. After the Cleanup-Semaphore routine has cleaned up the semaphore, the semaphore access record for process $P_x$ may be deallocated, since it is known from step 174 that the process is dead. In step 181, $P_x$→wants is set to null. This is done so that if the semaphore access record is assigned to a new process, the wants variable will be initialized. In step 182 the semaphore access record for $P_x$ is deallocated. As discussed above, such deallocation of semaphore access records would be well known to those skilled in the art. If the test in step 175 is false, it is known that the process is dead, but that the process cannot hold a semaphore because $P_x$→wants=null. Thus, all that is required is to deallocate the process semaphore access record in step 182. Control is passed to step 176 after step 182. Control is also passed to step 176 if the test of step 174 is false.

A test is performed during step 176 to determine whether a message was received from the GetSem routine requesting that a check be performed on a semaphore. This request for a check is generated by the GetSem routine as discussed above in conjunction with the GetSem routine and step 128 of FIG. 4B. If the test in step 176 is true, then the Cleanup-Semaphore routine is called during step 183 to cleanup the semaphore S which was sent in the message from the GetSem routine. Steps 176 and 183 are important in systems in which determining if a process is dead is either difficult or slow. In a system which can quickly identify dead processes, steps 176 and 183 may be removed. Control is passed to step 178 after step 183. Control is also passed to step 178 if the test of step 176 is false. In step 178 the process counter variable, X, is incremented by one and control is passed to step 172. In this manner, steps 174 through 183 will be performed for each process $P_1$–$P_N$. After these steps have been performed for each process, the test in step 172 will be false, and control is passed to step 170 and the routine repeats.

Figure 7A:
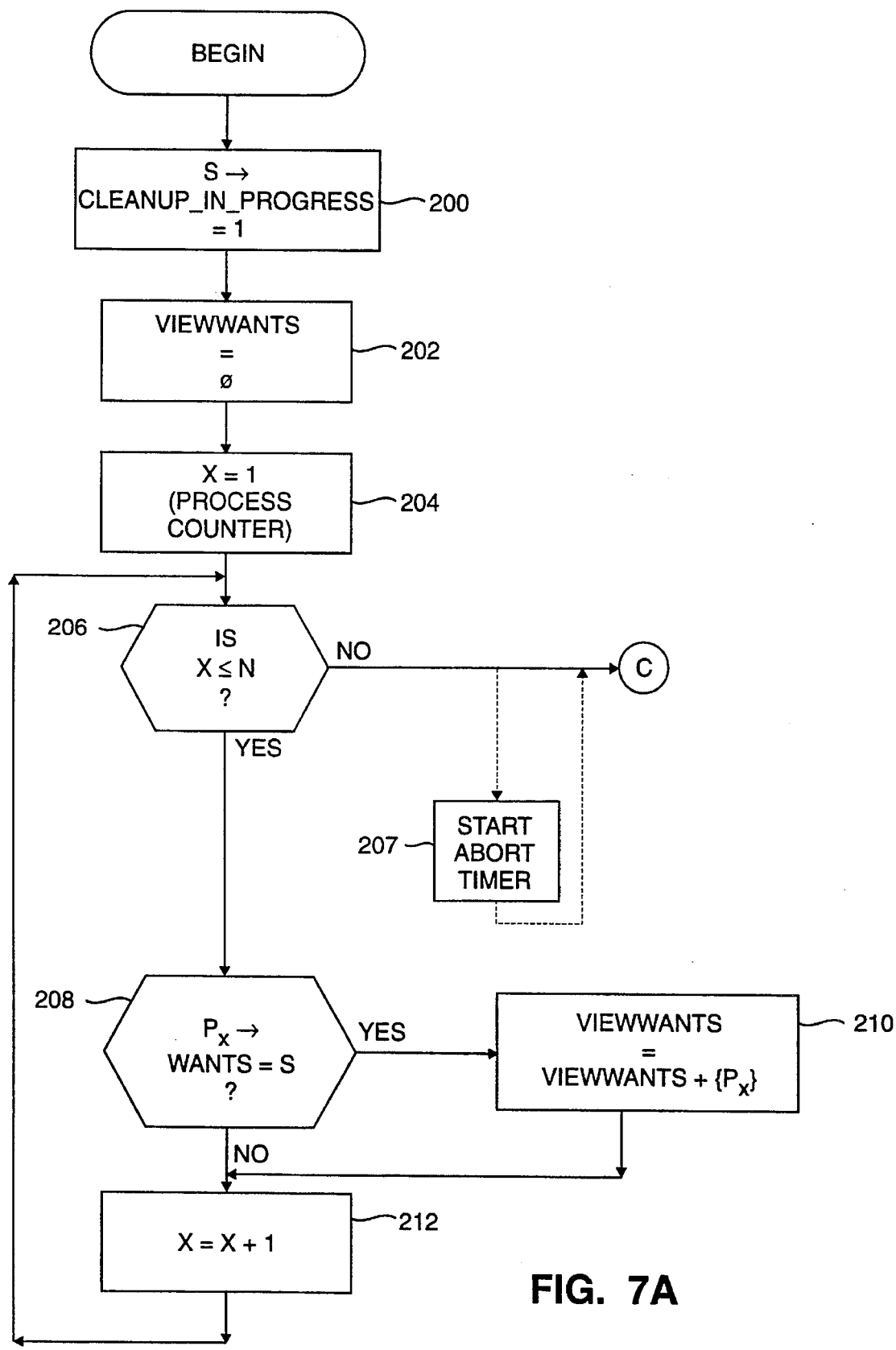
FIGS. 7A–7C show a flow diagram of the steps of the Cleanup-Semaphore routine for cleaning up a semaphore.
Figure 7B:
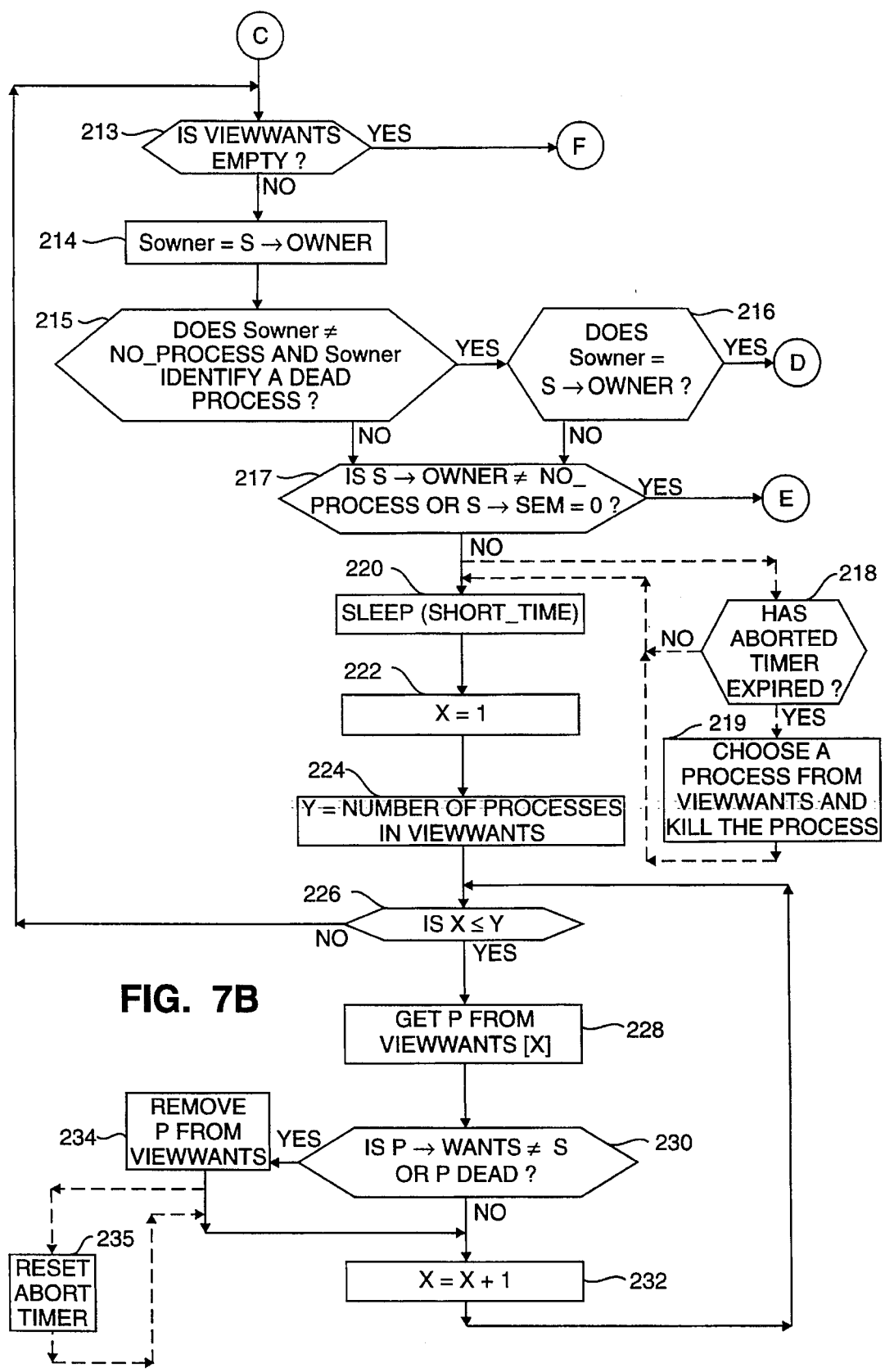
Figure 7C:
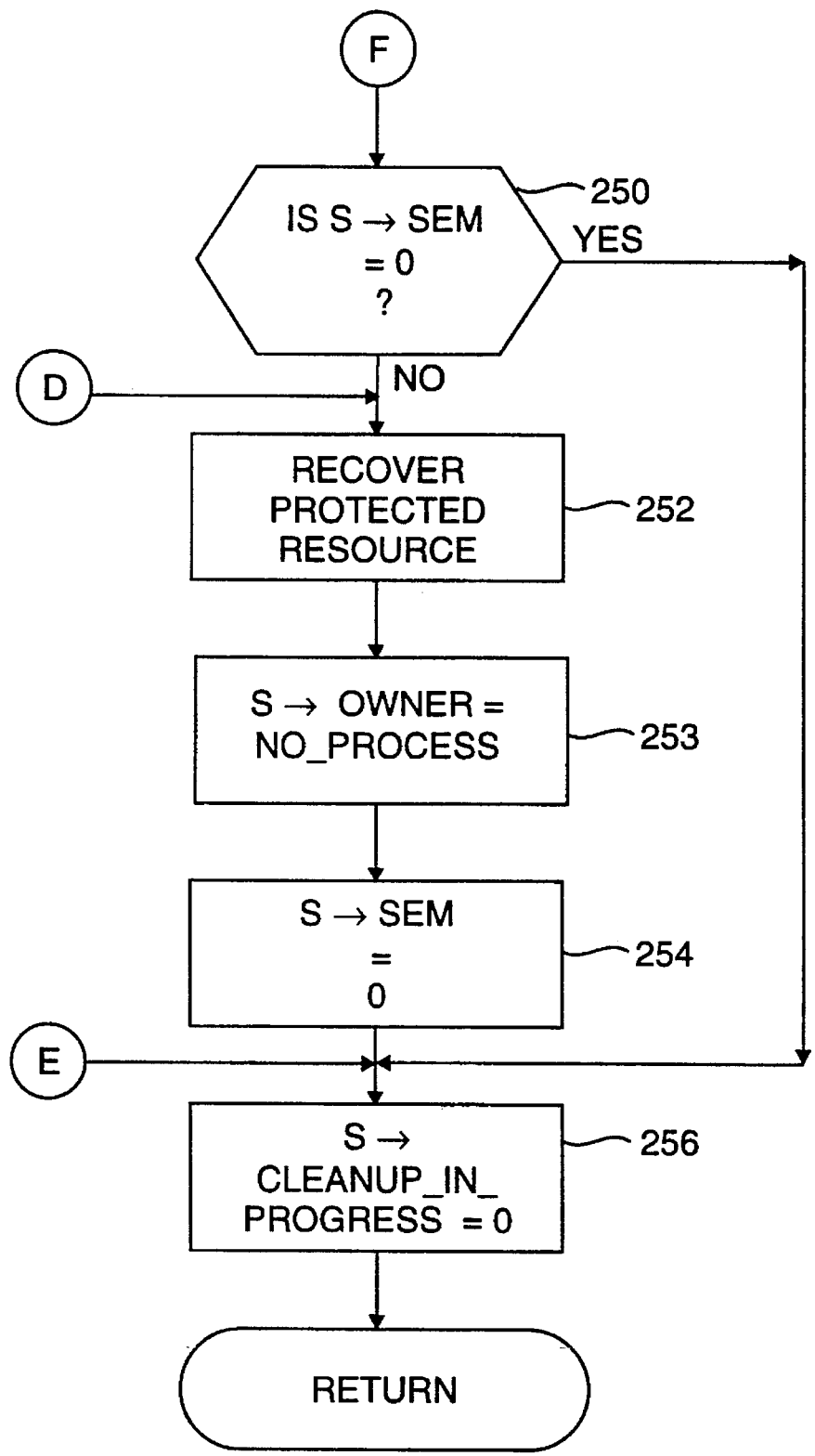

The Cleanup-Semaphore routine is described in conjunction with FIGS. 7A–7C. FIGS. 7A–7C contain three areas where flow diagram steps are shown connected by dotted lines. In particular, these are steps 207, 218–219, and 235. These are steps which are added to the Cleanup-Semaphore routine in an alternate embodiment of the invention. The routine will first be described without these steps. After this discussion, the addition of these steps will be described.

When the Cleanup-Semaphore routine is called by the Cleanup-Daemon, the Cleanup-Daemon passes an identification of the semaphore S which is to be cleaned up. In step 200, a barricade is raised by setting S→cleanup_in_progress to 1. This barricade prevents processes which do not currently want the semaphore from getting it while the Cleanup-Semaphore routine is executing and cleaning up the semaphore. This barricade prevents a continuous stream of live processes from arriving at the semaphore, and each entering an unobservable state at the point where the state of the semaphore was tested by the Cleanup-Semaphore routine, thus making it impossible to distinguish between such a case and the death of a process in an indeterminate state. This barricade is effective because, as discussed above in conjunction with FIGS. 4A and 4B and the GetSem routine, a process will not attempt to get a semaphore S while S→cleanup_in_progress=1. While S→cleanup_in_progress=1, the GetSem routine will continuously loop through steps 106–114.

Steps 202 through 212 of the Cleanup-Semaphore routine generate the set ViewWants, which will contain an identification of all processes which want the semaphore. These are the processes which could have, or could get, the semaphore S during execution of the Cleanup-Semaphore routine. ViewWants is the overestimate set of processes, and is generated as follows. In step 202, ViewWants is set to the null set. In step 204, a process counter variable, X, is initialized to 1. In step 206 X is compared to the number of processes N in the system 10. If X<=the number of processes N in the system, then in step 208 it is determined if $P_x$→wants=S, and if true, then process $P_x$ is added to the set ViewWants in step 210. After step 210, and if the test in step 208 is false, X is incremented by one in step 212 and control is passed to step 206. In this manner, steps 208 and 210 are repeated for each process $P_1$–$P_N$. At the point where the test in step 206 is false, ViewWants contains the entire overestimate set of processes which could have, or could acquire, the semaphore S. No other processes can get the semaphore because of the use of the barricade as described above. When the test in step 206 is false, control is passed to step 214 (FIG. 7B), and the main loop of the Cleanup-Semaphore routine is entered.

The main loop of the cleanup routine waits for one of two main loop conditions: (A) the state of the semaphore becomes determinable, either because no one has it, or because an owner is registered; or (B) ViewWants is empty, i.e., no live process remains that could possibly own the semaphore. The main loop consists of steps 214 through 234 and operates as follows. In step 214 it is determined whether ViewWants is empty. If so, then main loop condition (B) is satisfied and control is passed to step 250 (FIG. 7C). The execution path from step 250 will be discussed in further detail below. The manner in which ViewWants will become empty, and therefore satisfy main loop condition (B), will be discussed below in conjunction with steps 222–234.

If ViewWants is not empty, then the Cleanup-Semaphore routine considers main loop condition (A) in steps 214 through 217. In step 214, Sowner is assigned the value of S→owner. In step 215, it is determined whether both a) there is a registered owner of the semaphore S (Sowner not=No_Process); and b) the registered owner is dead. If this test is true, then a test is performed in step 216 to verify that S→owner has not changed since the execution of step 214. If the value of S→owner has not changed, then the main loop condition (A) has been satisfied in that the registered owner of semaphore S died while holding the semaphore, and control is passed to step 252 (FIG. 7C). The execution path from step 252 will be described in further detail below. If the test in step 215 or 216 is false, then in step 217 it is determined whether either a) there is a registered owner of the semaphore S (S→owner not=No_Process); or b) S→sem=0. If condition a) is true, and thus a registered owner exists, it is known from step 215 that that owner is not dead and therefore there is no problem with the semaphore S, so main loop condition (A) is again satisfied and control is passed to step 256 (FIG. 7C). If the registered owner dies immediately after the test in step 217, it will be recognized on a subsequent execution of the Cleanup-Semaphore routine. The execution path from step 256 will be described in further detail below. If conditionb) is true, namely, S→sem=0, then no process is holding the semaphore and again there is no problem with the semaphore S. Thus, main loop condition (A) is satisfied, and control is passed to step 256.

If, however, the test in step 217 is false, then in step 220 the Cleanup-Semaphore routine sleeps for a short time and control is passed to step 222. If the cleanup routine reaches step 222, it means that the main loop condition (A), that the state of the semaphore has become determinable, was not satisfied, and the routine continues until ViewWants becomes empty to satisfy main loop condition (B), as follows. In step 222 variable X is set to 1. In step 224 variable Y is set to the number of processes currently in ViewWants. In step 226, it is determined whether X< =Y. If X<=Y, then a process P is read from ViewWants[x] in step 228. In this notation, ViewWants[1] identifies the first process stored in the set ViewWants, ViewWants [2] identifies the second process stored in the set ViewWants, etc. In step 230, it is determined whether either a) P→wants does not=S; or b) process P is dead. If either condition a) or b) is true, then process P is removed from the set ViewWants in step 234. In step 232, X is incremented by 1 and control is passed to step 226. Thus, steps 228, 230, and 232 are repeated for each of the processes in the set ViewWants. For each such process, if the process no longer wants the semaphore S, or if the process has died, then it is removed from the set ViewWants in step 234. When these steps have been executed for each process in ViewWants, then the condition in step 226 will be false, and control will be passed to step 213. The main loop of the cleanup routine will continue until one of the main loop conditions discussed above is satisfied.

If main loop condition (B) is determined to be satisfied by the test in step 213, then control will pass to step 250 (FIG. 7C). At this point, since ViewWants is empty, it is known that either a dead process holds the semaphore or the semaphore is free. In step 250, it is determined whether S→sem=0. If S→sem=0, then the semaphore is free and control is passed to step 256, where the barricade is lowered by setting S→cleanup_in_progress=0, and the Cleanup-Semaphore routine ends. If it is determined in step 250 that S→sem is not=0, then it is known that the semaphore was held by a process which died, and control is passed to step 252. In step 252 appropriate action is taken with respect to the resource which was protected by semaphore S such that it may be available to other processes. The appropriate action to take at this point will depend on the type of resource. For example, the protected resource may be a data structure storing a set of sales figures and an average. The recovery action may be to recompute the average in the case where a process had modified a sales figure and crashed before it finished recomputing the average. As another example, if the protected resource were a printer, the recovery action might be to expel any partially printed pages so the next process to acquire access to the printer will begin on a new page.

In step 253 S→owner is set to No Process to indicate that there is no registered owner of the semaphore. In step 254, S→sem is set to 0. The barricade is lowered in step 256 to allow other processors to once again vie for this resource. The Cleanup-Semaphore routine then terminates.

As discussed above, if main loop condition (A) was determined to be satisfied by the test in step 216, then control is passed to step 252. In this situation, the registered owner died while holding the semaphore and steps 252 through 256 are executed as described above. If main loop condition (A) was satisfied by the test in step 217, then control is passed to step 256. As discussed above, in this situation, there is no problem with the semaphore and the barricade is lowered in step 256 and the Cleanup-Semaphore routine terminates.

The Cleanup-Semaphore routine described above will reach a decision as to the semaphore's status in a finite amount of time if all live processes make progress while executing the library provided semaphore acquisition and release code. Thus, the assumption is that processes must make progress while executing the GetSem and ReleaseSem routines. This assumption is necessary because of the main loop conditions (A) and (B) of the Cleanup-Semaphore routine. Main loop condition (B) is satisfied when the ViewWants set is empty. If main loop condition (A) is never satisfied, then the Cleanup-Semaphore routine assumes that the ViewWants set will eventually be empty as a result of steps 222–234. This will only occur if it is assumed that all processes make some progress while executing the library provided semaphore acquisition and release code. It is possible that processes may violate this assumption, either by having a very low priority and getting no processing time from the operating system, or due to other unexpected events, such as a user-written interrupt handler with an infinite loop. Thus, in a further embodiment of the invention, a modification is made to kill such processes if the fate of the semaphore cannot be resolved in a reasonable amount of time. This modification is as follows.

A timer is introduced, which is set upon the creation of the set ViewWants in the Cleanup-Semaphore routine. As shown by dotted lines, step 207, which is introduced between steps 206 and 213, will start an abort timer counting. Whenever a process is removed from the set ViewWants, the timer is reset. Step 235 is introduced between steps 234 and 232 as shown by the dotted lines in FIG. 7B. Also as indicated by dotted lines, steps 218 and 219 are added between steps 217 and 220 to check the abort timer. In step 218 it is determined whether the abort timer has expired. If it has, then a process is chosen from the set ViewWants and the process is killed (i.e. terminated). The process to kill may be chosen at random or by some other protocol, such as killing the process with the lowest priority. When a process is killed, it may be necessary to rollback its activities. An appropriate rollback procedure, such as undo logging, would be well known to one skilled in the art, and the details of such a procedure will not be discussed further herein. If the test in step 218 indicates that the abort timer has not expired, then processing continues at step 220. This embodiment removes the assumption that all processes will make progress during the execution of the library provided semaphore acquisition and release code, at the cost of possibly killing a process which is making no, or very slow, progress even though the process may not hold the semaphore. However, since the process is making no progress, there may not be much cost in killing it.

Figure 8A:
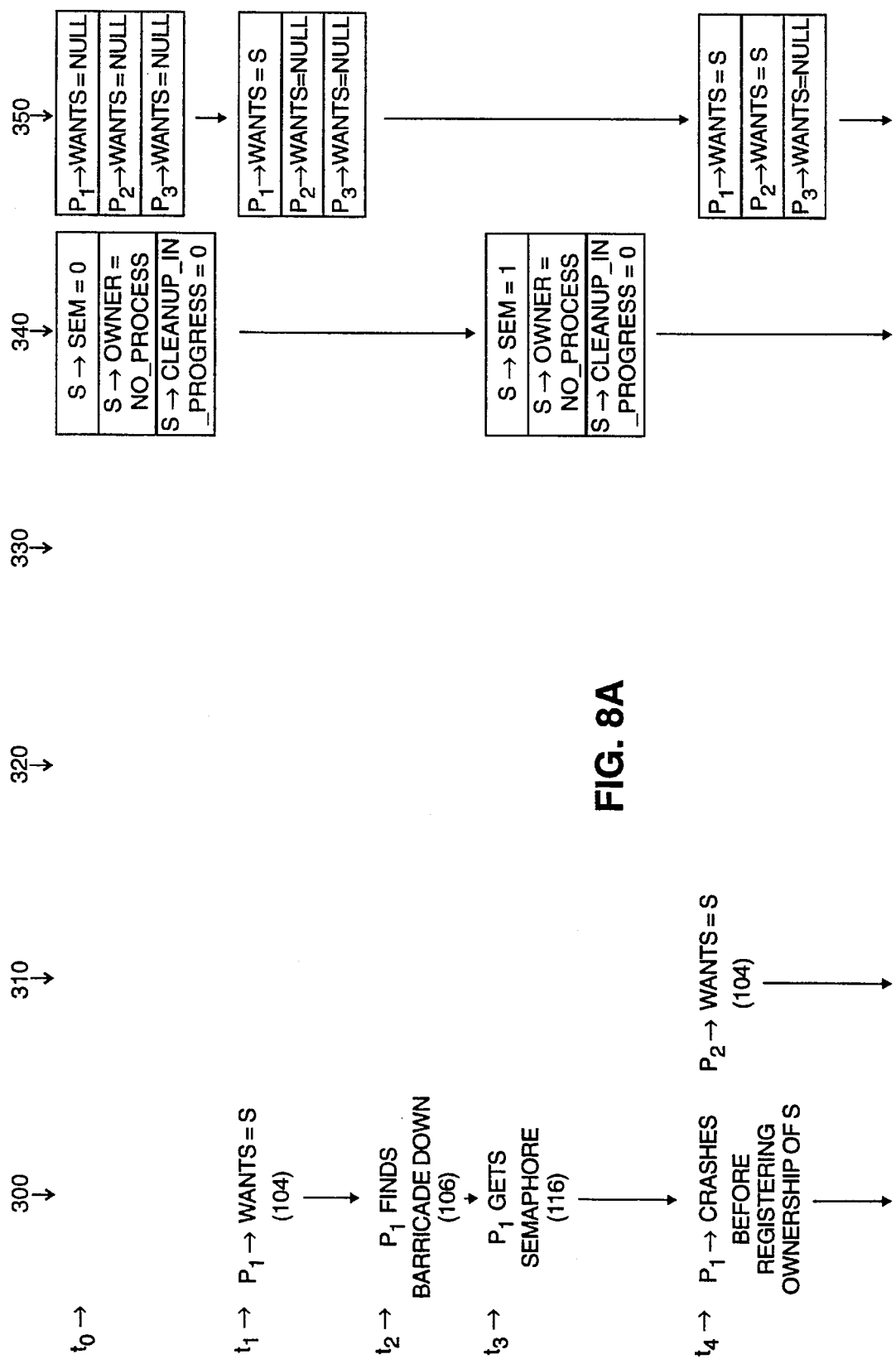
FIGS. 8A–8C show a time state diagram illustrating one example of the functioning of the Cleanup-Semaphore routine.
Figure 8B:
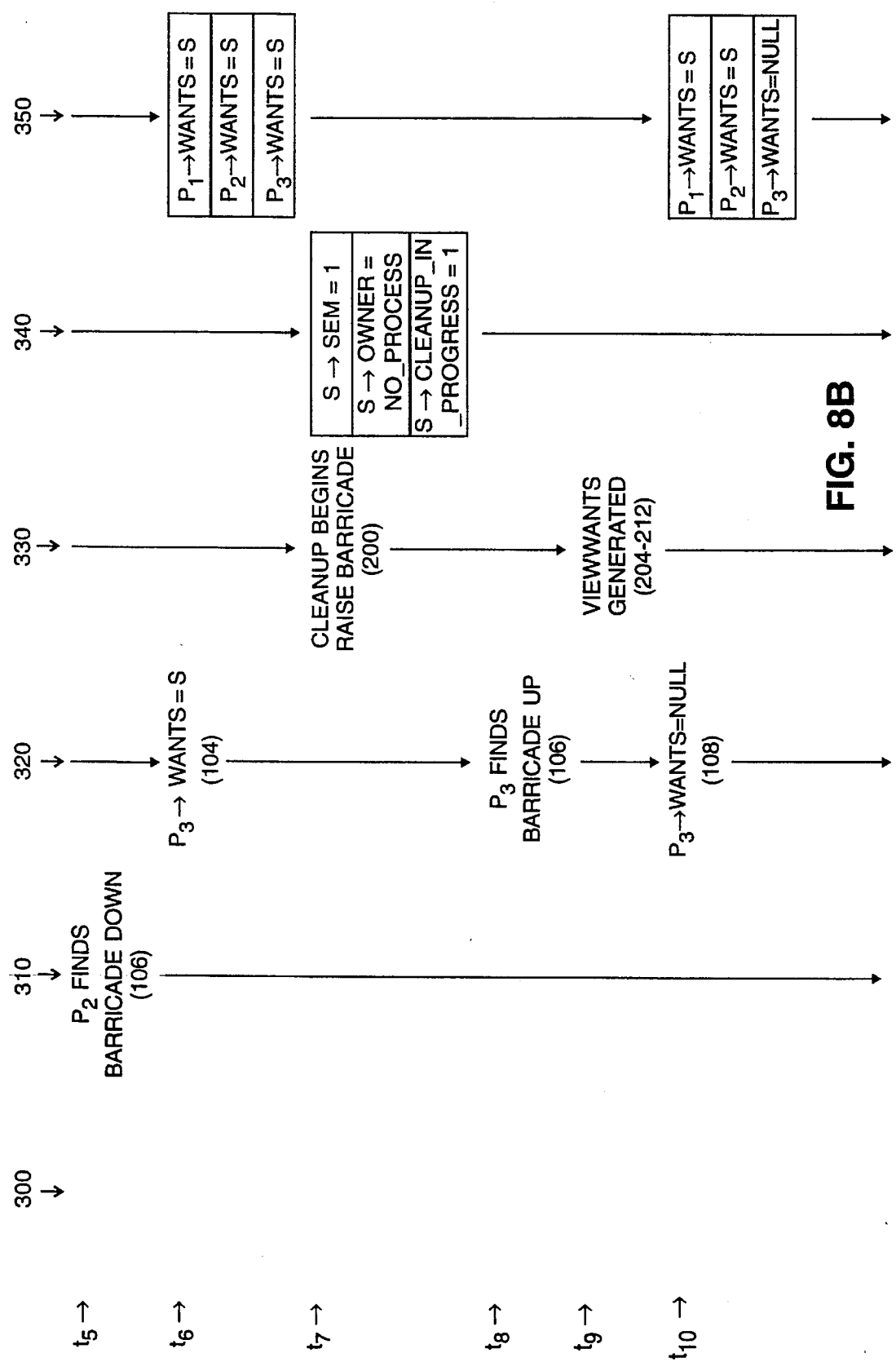
Figure 8C:
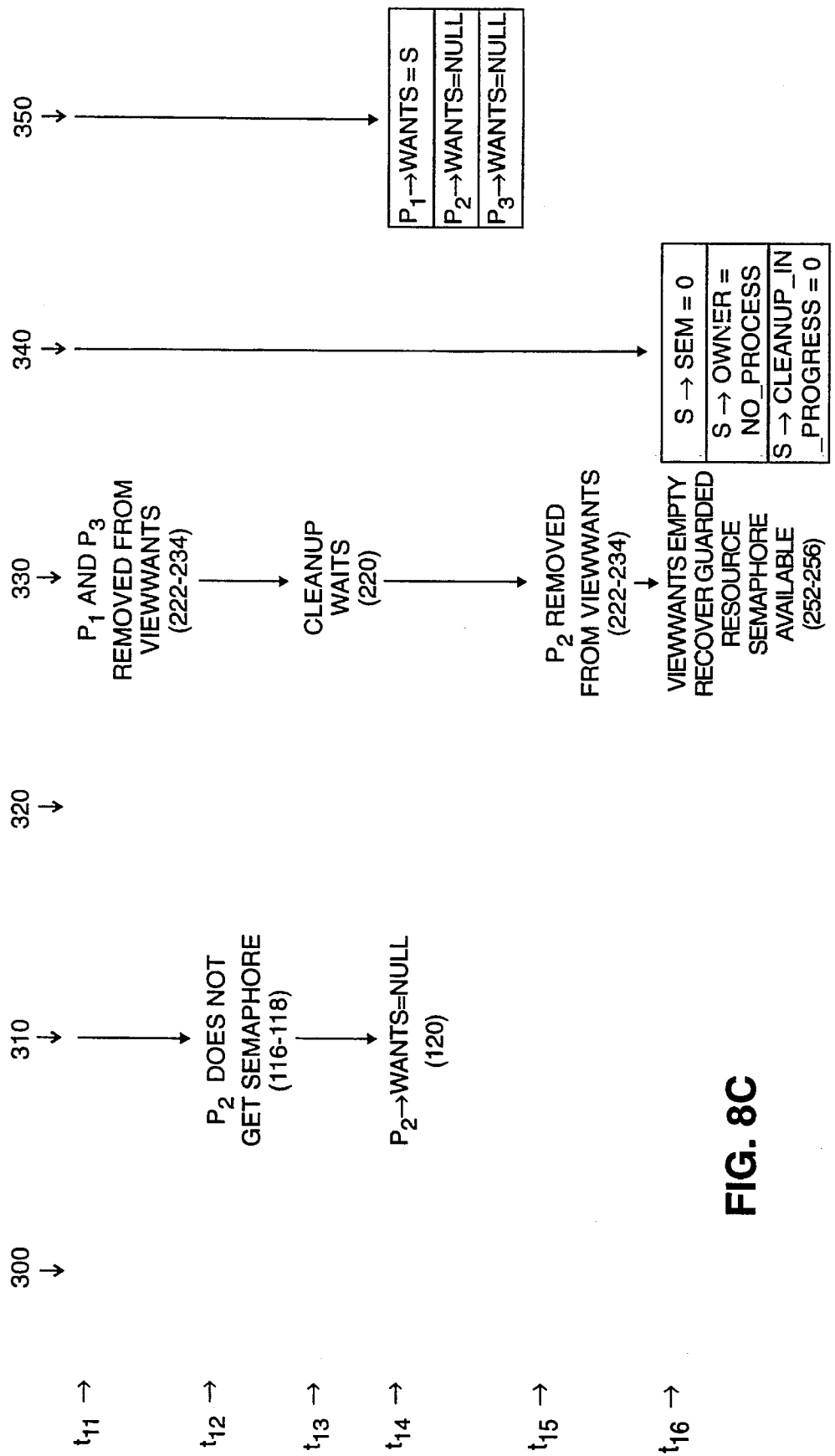

Although it is impractical to give examples for all possible scenarios, the following is one example of the operation of the present invention. The example is explained with reference to FIG. 8. The first three columns of FIG. 8 represent the functioning of processes. Column 300 represents process $P_1$, column 310 represents process $P_2$, and column 320 represents process $P_3$. Column 330 represents the operation of the Cleanup-Semaphore routine. Column 340 shows the status of the semaphore structure 38 for the semaphore S which is being cleaned up by the Cleanup-Semaphore routine. Column 350 shows the status of the semaphore access structure 37 for each of the processes $P_{1-3}$, which are discussed in this example. FIG. 8 represents the functioning of the various processes and the Cleanup-Semaphore routine over a time period starting at $t_0$ and ending with The step number from FIGS. 4–7, in which the operation takes place, is shown in parentheses below the description of the operation. With respect to columns 340 and 350, only changes are shown in the semaphore structure 38 and the semaphore access structure 37. Thus, it is assumed that, until a change is indicated, the contents of these structures remains the same as previously shown. FIG. 8 will become clear with reference to the following discussion.

Initially at time $t_0$, the semaphore record for semaphore S contains the following values:

S→sem=0

S→owner=No_Process

S→cleanup_in_progress=0

The semaphore access records for processes $P_{1-3}$ contain the following values:

$P_1$→wants=null $P_2$→wants=null $P_3$→wants=null

At time $t_0$, the semaphore S is available, there is no registered owner, and the cleanup barricade is down. At time $t_1$ process $P_1$ calls the GetSem routine and registers its intention to acquire the semaphore by setting $P_1$→wants=S. At time $t_2$, process $P_1$ finds the barricade down (S→cleanup_in_progress= 0). At time $t_3$, process $P_1$ gets the semaphore and sets S→sem=1. At time $t_4$, process $P_1$ crashes. Note that as of time $t_4$, process $P_1$ had not registered ownership of the semaphore. Also at time $t_4$, process $P_2$ calls the GetSem routine and registers its intention to acquire the semaphore by setting $P_2$→wants=S. At time $t_5$, process $P_2$ finds the barricade down, but before it can make an attempt to acquire the semaphore, a processing unit context switch occurs and the execution of process $P_2$ is suspended. At time $t_6$, process $P_3$ calls the GetSem routine and registers its intention to acquire the semaphore by setting $P_3$→wants=S. Before process $P_3$ has a chance to check the barricade, there is a context switch and the execution of process $P_3$ is suspended. At time $t_7$, the Cleanup-Daemon notices that $P_1$ is dead and calls the cleanup routine. The cleanup routine immediately raises the barricade by setting S→cleanup_in_progress=1. At time $t_8$, process $P_3$ wakes up and finds the barricade up and thus does not attempt to get the semaphore. Instead, it waits for the barricade to go down. At time $t_9$, the Cleanup-Semaphore routine generates the ViewWants set. ViewWants includes $P_1$, $P_2$, and $P_3$, because the semaphore access structure indicates that all three processes want semaphore S. At time $t_{10}$ process $P_3$ sets $P_3$→wants=Null and enters the loop at steps 110–112 waiting for the barricade to be lowered. At time $t_{11}$, $P_1$ and $P_3$ are removed from ViewWants as a result of the decision at step 230, $P_1$ because it is dead, and $P_3$ because it no longer wants the semaphore ($P_3$→wants=null).

At this point, only a single live process, $P_2$, may be holding the semaphore, but unless it registers ownership, it may also be the case that a dead process holds it (as is the case in this example). Thus, the Cleanup-Semaphore routine waits for $P_2$ to make some progress. (This example assumes that all processes make progress while executing the library provided semaphore acquisition and release code.)

At time $t_{12}$, process $P_2$ begins executing again and it makes enough progress to attempt to get the semaphore. However, it fails because $P_1$ still holds the semaphore. The Cleanup-Semaphore routine continues waiting ($t_{13}$). At time $t_{14}$, process $P_2$ progresses several more instructions and deregisters its interest in the semaphore ($P_2$→want=null). Process $P_2$ will now sleep and try for the semaphore again at a later time. If process $P_2$ tries to get the semaphore before the Cleanup-Semaphore routine ends, it will be stopped by the barricade. At time $t_{15}$, the Cleanup-Semaphore routine notices that process $P_2$ has deregistered interest in the semaphore, and removes it from ViewWants. Since ViewWants is now empty, the Cleanup-Semaphore routine concludes that no live process can hold the semaphore. Since the semaphore is still held, the Cleanup-Semaphore routine concludes that the semaphore is held by a dead process, and proceeds to recover the resource protected by the semaphore. Once the cleanup routine has recovered the resource, it returns the semaphore to use by setting S→sem=0 and it lowers the barricade (S→cleanup_in_progress=0) at time $t_{16}$. Upon termination of the Cleanup-Semaphore routine, $P_1$→wants will be set to null and the semaphore access record for $P_1$ will be deallocated by the Cleanup-Daemon routine, as described above in connection with steps 181 and 182 of FIG. 6. At this point, $P_2$ and $P_3$, as well as any other processes can attempt once again to acquire S.

It is to be understood that the embodiments shown and described herein are only illustrative of the principles of the present invention and that various modifications may be implemented by those skilled in the art without departing from the scope and spirit of the invention. For example, the description herein assumed that a process holds only one semaphore at one time. However, one skilled in the art could readily extend the mechanism described herein and implement it in a system in which a process may hold multiple semaphores at one time. Such an extension would be readily apparent to one skilled in the art in view of the fact that only one semaphore can be in doubt for a given process at any time.

We claim:

1. A computer system comprising:

at least one processing unit;

a plurality of shared resources, including a memory unit, accessible by said at least one processing unit;

a plurality of semaphore records stored in said memory unit, each of said semaphore records associated with one of said plurality of shared resources, wherein each of said semaphore records comprises:

a) availability indicia means for indicating whether the semaphore record is available, b) owner identification means for registering ownership of the semaphore record, and c) cleanup indicia for indicating whether the semaphore record is being evaluated by a cleanup routine;

a plurality of processes executing on said plurality of processing units, said processes requesting and acquiring exclusive access to said plurality of shared resources by requesting and acquiring ownership of said semaphore records; and a plurality of semaphore access records stored in said memory unit, each of said semaphore access records associated with one of said plurality of processes, for identifying a semaphore record which said process associated with said semaphore access record wants to acquire ownership of;

wherein said cleanup routine comprises means for determining whether a semaphore record is owned by a process that has crashed by using information in said semaphore records and said semaphore access records and means for resetting the availability indicia of a semaphore record when the semaphore record is owned by a process that has crashed.

2. The apparatus of claim 1 further comprising:

means for storing identification of a semaphore record in a semaphore access record associated with a process before said process attempts to acquire said semaphore record; and means for storing identification of a process in the owner identification of a semaphore record after said process has acquired ownership of the semaphore record.

3. The apparatus of claim 1 further comprising:

means for removing identification of a process from the owner identification of a semaphore record before said process releases ownership of said semaphore record; and means for removing identification of a semaphore record from a semaphore access record associated with a process after said process releases ownership of said semaphore record.

4. The apparatus of claim 1 further comprising:

means for preventing a process from acquiring a semaphore record when said cleanup indicia of said semaphore record indicates that said semaphore record is being evaluated by said cleanup routine.

5. A crash safe system for enforcing mutually exclusive access to shared data in a computer system comprising:

at least one processing unit;

a memory unit connected to said at least one processing unit for storing a plurality of data structures and a semaphore access structure and a semaphore structure;

a plurality of semaphore records, each associated with one of said plurality of data structures, comprising availability indicia for indicating whether said semaphore record is available, said semaphore records being stored in said semaphore structure in said memory unit;

a plurality of semaphore access records stored in said semaphore access structure in said memory unit;

a plurality of processes executing on said at least one processing unit, said processes requesting and acquiring exclusive access to said data structures by requesting and acquiring ownership of said semaphore records;

means for maintaining an underestimate of semaphore ownership in said memory unit; and means for maintaining an overestimate of semaphore ownership in said memory unit; and cleanup means operating on said semaphore records and said semaphore access records for determining whether a semaphore record is owned by a process that has crashed by evaluating said underestimate of semaphore ownership and said overestimate of semaphore ownership and for resetting the availability indicia of a semaphore record when the semaphore record is owned by said process that has crashed.

6. The apparatus of claim 5 wherein said means for maintaining an overestimate of semaphore ownership further comprises:

means for storing in said memory unit an indication that a process wants to acquire a semaphore record, prior to said process requesting ownership of said semaphore record; and means for removing from said memory unit said indication that a process wants to acquire a semaphore record, subsequent to said process releasing ownership of said semaphore record.

7. The apparatus of claim 5 wherein said means for maintaining an underestimate of semaphore ownership further comprises:

means for storing in said memory unit an identification of a process which owns a semaphore record, subsequent to said process acquiring ownership of said semaphore record; and means for removing from said memory unit said identification of a process which owns a semaphore record, prior to said process releasing ownership of said semaphore record.

8. The apparatus of claim 5 further comprising:

means for terminating a process which has not progressed for at least a predetermined period of time.

9. The apparatus of claim 5 further comprising:

a plurality of cleanup indicators stored in said memory unit for indicating whether said cleanup means is operating on said plurality of semaphore records.

10. The apparatus of claim 9 further comprising:

means for preventing a process from acquiring ownership of a semaphore record when one of said plurality of cleanup indicator indicates that said cleanup means is operating on said semaphore record.

11. The apparatus of claim 5 further comprising:

means for initiating said cleanup means when a semaphore record has been unavailable for at least a predetermined time period.

12. A method for enforcing mutually exclusive access to shared resources in a computer system, wherein each of said shared resources has an associated semaphore stored in a memory unit, said method comprising the steps of:

initiating execution of a first routine when a first process wants access to a shared resource, wherein said first routine comprises the steps of:

storing in memory an indication that said first process wants to acquire ownership of said semaphore associated with said shared resource, acquiring ownership of said semaphore associated with said shared resource, and storing in memory an indication that said process is the registered owner of said semaphore; and initiating the execution of a second routine when said first process wants to release said shared resource, wherein said second routine comprises the steps of:

storing in memory an indication that said first process is not the registered owner of the semaphore associated with said shared resource, releasing said semaphore, and storing in memory an indication that said process does not want to acquire ownership of said semaphore; and initiating the execution of a cleanup routine for said semaphore whenever said first process crashes prior to releasing said semaphore while an indication that a second process wants to acquire ownership of said semaphore is stored in memory.

13. The method of claim 12 wherein said step of initiating the execution of a cleanup routine for a semaphore further comprises the step:

initiating the execution of a cleanup routine for a semaphore when said semaphore has been unavailable for at least a predetermined time period.

14. The method of claim 12 wherein said first routine further comprises the steps:

determining if said cleanup routine is being executed for a semaphore; and waiting for said cleanup routine to terminate before acquiring said semaphore whenever a cleanup routine is being executed for a semaphore.

15. The method of claim 12 wherein said cleanup routine comprises the steps:

generating an overestimate set of processes which want to acquire the semaphore by employing means for maintaining an overestimate of semaphore ownership in said memory unit including means for storing in said memory unit an indication that a process wants to acquire a semaphore record, prior to said process requesting ownership of said semaphore record and means for removing from said memory unit said indication that a process wants to acquire a semaphore record, subsequent to said process releasing ownership of said semaphore record;

removing a process from the overestimate set when said process no longer wants to acquire the semaphore or said process is dead;

determining if the semaphore is held by a process when said overestimate set is empty; and recovering said resource associated with said semaphore and releasing said semaphore whenever said semaphore is held by a process when said overestimate set is empty.

16. The method of claim 15 wherein said cleanup routine further comprises the step:

terminating a process which has not progressed for at least a predetermined period of time.

17. The method of claim 12 wherein said cleanup routine comprises the steps:

determining if there is a registered owner of the semaphore and if the registered owner is a dead process; and if there is a registered owner of the semaphore and if the registered owner is a dead process, then recovering the resource associated with the semaphore and releasing the semaphore.

18. A method of enforcing mutually exclusive access to shared resources in a computer system, said computer system comprising a memory unit and a plurality of processes executing on at least one processing unit, wherein said exclusive access to a shared resource is gained by acquiring a semaphore associated with the shared resource, the method comprising the steps:

registering in said memory unit an intention of one process of said plurality of processes to acquire a semaphore prior to said one process attempting to acquire said semaphore;

registering in said memory unit said one process as the owner of said semaphore after said one process acquires said semaphore;

deregistering in said memory unit said one process as the owner of said semaphore before said process releases said semaphore;

deregistering in said memory unit said intention of said one process to acquire a semaphore after said process releases the semaphore;

whereby an underestimate of said one process has the semaphore and an overestimate of said one process has the semaphore are generated;

determining if said underestimate matches said overestimate and, determining that a crash has occurred whenever said underestimate does not match said overestimate; and initiating the execution of a cleanup routine for a semaphore when a process which registered its intention to acquire said semaphore crashes.

19. The method of claim 18 further comprising the step:

preventing a process from acquiring a semaphore when said cleanup routine has been initiated for said semaphore.

20. The method of claim 18 further comprising the step of:

terminating a process which has not progressed for at least a predetermined period of time.

21. The method of claim 18 further comprising the step:

initiating execution of a cleanup routine for a semaphore when said semaphore has been unavailable for at least a predetermined time period.

22. The method of claim 21 further comprising the step:

preventing a process from acquiring a semaphore when said cleanup routine has been initiated for said semaphore.

23. The method of claim 21 further comprising the step:

terminating a process which has not progressed for at least a predetermined period of time.

24. A computer system, comprising:

A) at least one processing unit;

B) a plurality of shared resources accessible by each processing unit and including a memory unit;

C) a plurality of semaphore records stored in said memory unit and containing an owner identification for registering ownership of the semaphore record;

D) a plurality of processes executing on said processing unit(s), said processes requesting and acquiring exclusive access to said shared resources by requesting and acquiring ownership of said semaphore records;

E) a plurality of semaphore access records stored in said memory unit, each of which is associated with one of said processes, for identifying a semaphore record which the process associated with said semaphore access record wants to acquire ownership of;

F) means for maintaining an underestimate of semaphore ownership comprising:
  i) means for storing in said memory unit an identification of a process which owns a semaphore record, subsequent to said process acquiring ownership of said semaphore record; and
  ii) means for removing from said memory unit said identification of a process which owns a semaphore record, prior to said process releasing ownership of said semaphore record;
G) means for maintaining an overestimate of semaphore ownership comprising:
  i) means for storing in said memory unit an indication that a process wants to acquire a semaphore record, prior to said process requesting ownership of said semaphore record; and
  ii) means for removing from said memory unit said indication that a process wants to acquire a semaphore record, subsequent to said process releasing ownership of said semaphore record;
H) means for determining whether the underestimate obtained in F) matches the overestimate obtained in G);
wherein each of said semaphore records is associated with one of said shared resources and comprises:
  A) availability indicia for indicating whether the semaphore record is available; and
  B) cleanup indicia for indicating whether the semaphore record is being evaluated by a cleanup means;
wherein said cleanup means is activated when the underestimate obtained in F) does not match the overestimate obtained in G) and comprises:
  A) means for determining whether a semaphore record is owned by a process which has crashed by using said information in said semaphore records and said semaphore access records; and
  B) means for resetting the availability indicia of a semaphore record when the semaphore record is owned by a process that has crashed.

25. A crash safe system for enforcing mutually exclusive access to shared data in a computer system comprising:
  A) at least one processing unit;
  B) a plurality of shared resources accessible by each processing unit and including a memory unit;
  C) a plurality of semaphore records stored in said memory unit and containing an owner identification for registering ownership of the semaphore record;
  D) a plurality of processes executing on said processing unit(s), said processes requesting and acquiring exclusive access to said shared resources by requesting and acquiring ownership of said semaphore records;
  E) a plurality of semaphore access records stored in said memory unit, each of which is associated with one of said processes, for identifying a semaphore record which the process associated with said semaphore access record wants to acquire ownership of;
  F) means for maintaining an underestimate of semaphore ownership comprising:
    i) means for storing in said memory unit an identification of a process which owns a semaphore record, subsequent to said process acquiring ownership of said semaphore record; and
    ii) means for removing from said memory unit said identification of a process which owns a semaphore record, prior to said process releasing ownership of said semaphore record;
  G) means for maintaining an overestimate of semaphore ownership comprising:
    i) means for storing in said memory unit an indication that a process wants to acquire a semaphore record, prior to said process requesting ownership of said semaphore record; and
    ii) means for removing from said memory unit said indication that a process wants to acquire a semaphore record, subsequent to said process releasing ownership of said semaphore record;
  H) means for determining whether the underestimate obtained in F) matches the overestimate obtained in G);
wherein each of said semaphore records is associated with one of said shared resources and comprises:
  A) availability indicia for indicating whether the semaphore record is available; and
  B) cleanup indicia for indicating whether the semaphore record is being evaluated by a cleanup means;
wherein said cleanup means is activated when the underestimate obtained in F) does not match the overestimate obtained in G) and comprises:
  A) means for determining whether a semaphore record is owned by a process which has crashed by using said information in said semaphore records and said semaphore access records; and
  B) means for resetting the availability indicia of a semaphore record when the semaphore record is owned by a process that has crashed.

\* \* \* \* \*